Jan. 30, 1968   J. F. JAMMET   3,366,512
ELECTRIC CELL HAVING ELECTRODE CONTACT CAP
COVERED WITH PROTECTIVE SEAL
Filed Jan. 20, 1966

INVENTOR
JEAN FIRMIN JAMMET
BY
ATTORNEYS

United States Patent Office 3,366,512
Patented Jan. 30, 1968

3,366,512
ELECTRIC CELL HAVING ELECTRODE CONTACT CAP COVERED WITH PROTECTIVE SEAL
Jean F. Jammet, Poitiers, France, assignor to Societe des Accumulateurs Fixes et de Traction (Societe Anonyme), Romainville, France, a company of France
Filed Jan. 20, 1966, Ser. No. 521,837
Claims priority, application France, Jan. 22, 1965, 2,974
2 Claims. (Cl. 136—181)

ABSTRACT OF THE DISCLOSURE

Protective cover for an electric cell having an electrode covered by an exposed metallic contact cap and wherein the cap has a boss with a limited opening therein, the protective cover including a disc-like portion overlying the exposed surface of the metallic contact cap, an integral stud portion extending through the opening and an enlarged flange portion of larger dimensions than the opening located on the underside of the cap and integral with the stud portion, the enlarged flange portion and the stu portion serving to retain the disc-like portion in covering condtiion on the exposed surface of the cap and being deformable to permit forcible removal of the cover from said cap when the cell is to be placed into use, the enlarged flange portion thereafter preventing replacement of the cover on the cap.

---

This invention relates to a protective device for primary cells or similar devices and more particularly to cells where the positive terminal is constituted by a central metal cap covering for instance the end of the carbon rod used as a positive electrode.

Battery manufacturers have long been anxious to find protective seals to prevent any accidental contact between both terminals and any premature use of the cell in any apparatus.

Objects and features of this invention are to provide a particularly simple and efficient solution to this problem.

A principal object of the invention is to provide a protective seal for primary cells or similar devices and more particularly for cells where the positive terminal is constituted by a central metal cap covering for instance the end of the carbon rod used as a positive electrode. The solution is especially remarkable in that the said seal is constituted by a disk or such like made of plastic material and also comprising a stud integral with the disk which is located and maintained in an opening in the cap, said stud having at its lower part a flange which is engaged under the edges defining said opening and which is so shaped that once the protective seal is taken off it cannot be put back. Thus, any danger of accidental electric contact with the metallic cap of the positive terminal is prevented, and electric connections between both terminals cannot occur prior to use and until removal of the disk by the user.

According to a characteristic of the invention, the said opening is provided in a small boss provided on the upper part of the metallic cap. In this way, when the cap is applied onto the substantially flat outer end of the positive carbon terminal, the recess defined by the hollow part of the said boss provides a housing for the flange of the stud.

According to a feature of the invention, the protective disk and its stud are obtained by molding "in situ," e.g., by injection molding.

When the cell is to be used, the protective disk can be very simply removed, the user inserting for instance a nail, knife edge or the like between the said disk and the cap.

Figure 1:
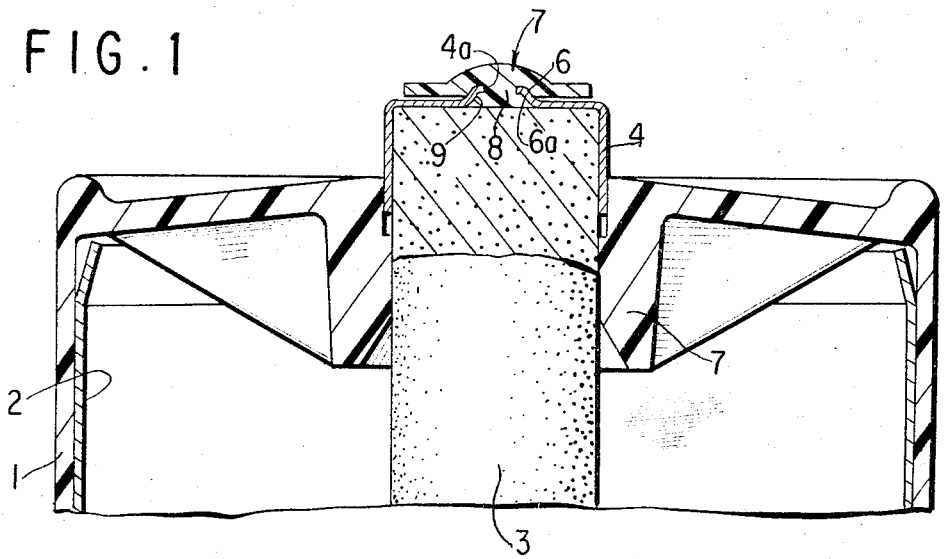
Figure 2:
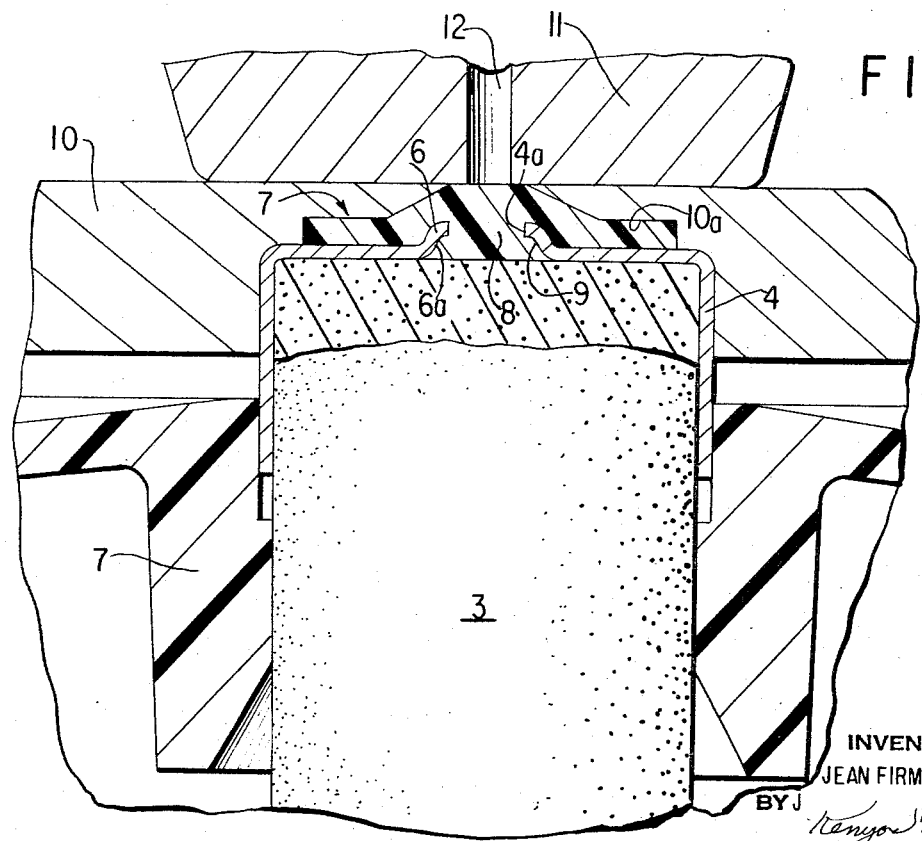

Other objects and features of the invention will become apparent in the following description in relation to the annexed drawings in which:

FIG. 1 is a fragmentary sectional view of the upper part of a primary cell provided with a protective seal according to the invention; and FIG. 2 diagrammatically shows the principle of the molding operation for providing the said protective seal.

Referring to the drawing, 1 is the conventional plastic or other insulative envelope of the cell, 2 is the zinc cup constituting the negative electrode, 3 the central carbon rod constituting the positive electrode, and 4 the usual metal cap made, e.g., of brass that is mounted on and covers the outer end of said central rod 3.

The top of the metal cap 4 is provided with a central opening 4a advantageously made in a small boss 6 which can be very simply obtained when the cap is perforated to form said opening 4a, by making the opening 4a from the inside to the outside of said cap. 7 is the protective seal constituted by a disk and also comprising an integral stud 8 which is located in the opening of the cap and which has in its lower part an integral flange or enlargement 9 that is engaged under the edges defining the said opening 4a in the recess 6a defined by said boss 6.

According to the invention, the protective seal 7 is composed of an elastically flexible plastic material that is not brittle so that it can be removed in one piece from the cap 4 by insertion of a nail or knife edge between it and the top surface of cap 4, the stud 8 and flange 9 being deformed during removal to pass out through opening 4a. The seal 7 cannot, after removal, be replaced on cap 4 because the normal dimensions of its flange 9 are greater than the diameter of opening 4a. Prior to removal, the seal 7 is retained on cap 4 because flange 9 has larger dimensions than opening 4a and must be deformed by the force provided by the nail or knife edge for removal of said seal 7.

As a non-limitative example, the plastic material of which seal 7 is comprised may be polyethylene.

According to the invention, the protective seal 7 is obtained by molding in situ onto the previously perforated cap 4 which has been mounted on carbon rod 3, e.g., by injection molding. This operation is diagrammatically illustrated in FIG. 2, wherein 10 is the seal molding die and 11 the injection head for introducing the molding material which is introduced through channel 12 of said head into the molding recess 10a of die 10 after the upper end of the cell has been positioned in the die under recess 10a.

Since the protective seal 7 is of small volume and therefore has small caloric mass, only a small amount of plastic material need be injected via channel 12 into recess 10a and takes the regular shape of seal 7 with its stud 8 and flange 9 which are substantially immediately solidified in such shape.

The protective seal, while described as applicable to primary cells, is equally applicable to any type of cell or device having a normally-exposed contact stud terminal as is apparent. Thus, while specific examples have been described and shown, variations in detail within the scope of the appended claims are possible and are contemplated. There is no intention of limitation to the exact disclosures or abstract herein presented.

What is claimed is:

1. In an electric cell having an electrode covered by an exposed metallic contact cap, said cap having a central boss with a limited opening therein, a protective seal of insulative material for said cap, said seal including a disc-like portion overlying the exposed surface of said metallic contact cap, an integral stud portion extending through the opening in said cap and an enlarged flange portion of larger dimensions than said opening integral with said stud and located on the under side of said cap, said enlarged flange portion and said stud serving to retain said disc-like portion in covering condition on the exposed surface of said cap and being deformable to permit forcible removal of said seal from said cap when said cell is to be placed into use and said enlarged flange portion preventing replacement of the seal on said cap subsequent to its removal therefrom.

2. In an electric cell according to claim 1, said seal being of polyethylene.

References Cited

UNITED STATES PATENTS

| 2,688,581 | 9/1954 | Stubbs | 264—273 X |
| 2,790,022 | 4/1957 | Glesner | 136—177 |
| 3,220,885 | 11/1965 | Udell et al. | 136—181 X |
| 3,320,096 | 5/1967 | Jammet | 136—181 X |

FOREIGN PATENTS 770,607 3/1957 Great Britain.

ALLEN B. CURTIS, *Primary Examiner.*

WINSTON A. DOUGLAS, *Examiner.*

D. L. WALTON, *Assistant Examiner.*